United States Patent [19]
Sargent

[11] 3,740,773
[45] June 26, 1973

[54] METHOD AND APPARATUS FOR DISPOSING OF HUMAN WASTE IN A VEHICLE
[75] Inventor: Charles L. Sargent, Ypsilanti, Mich.
[73] Assignee: Thermason Corporation, Ann Arbor, Mich.
[22] Filed: June 24, 1971
[21] Appl. No.: 156,403

[52] U.S. Cl. .......................... 4/114, 4/131
[51] Int. Cl. ............................. B60r 15/04
[58] Field of Search ........................... 4/8, 114, 131

[56] References Cited
UNITED STATES PATENTS
2,565,720  8/1951  Collison et al. .......................... 4/131
2,658,202  11/1953  Wolman et al. .............................. 4/8
1,818,586  8/1931  Schumacher ....................... 4/114 X Primary Examiner—Kenneth W. Sprague
Attorney—Finn G. Olsen et al.

[57] ABSTRACT

A method and apparatus for disposing of liquid and organic waste in a vehicle wherein the waste is periodically moved by a pump from a holding tank to a heating chamber which utilizes the heat of the vehicle exhaust. In the heating chamber, all bacteria in the waste are vaporized and destroyed by the heat of the vehicle exhaust which converts the waste to a product that is principally steam and which can be harmlessly passed through the remainder of the exhaust system. The pump which conveys the waste from the holding tank to the heating chamber operates only when a combination of two circumstances exist, namely, only when the vehicle is travelling at a speed above a predetermined speed and when the temperature in the heating chamber is above a predetermined temperature. Limiting the operation of the apparatus to those times when the vehicle is moving is also utilized to prevent clogging of the filtered inlet of the pipe which extends into the holding tank so as to employ the agitation of the liquid therein to wash the pipe inlet.

12 Claims, 6 Drawing Figures

INVENTOR
CHARLES L. SARGENT
BY Olsen & Stephenson
ATTORNEYS

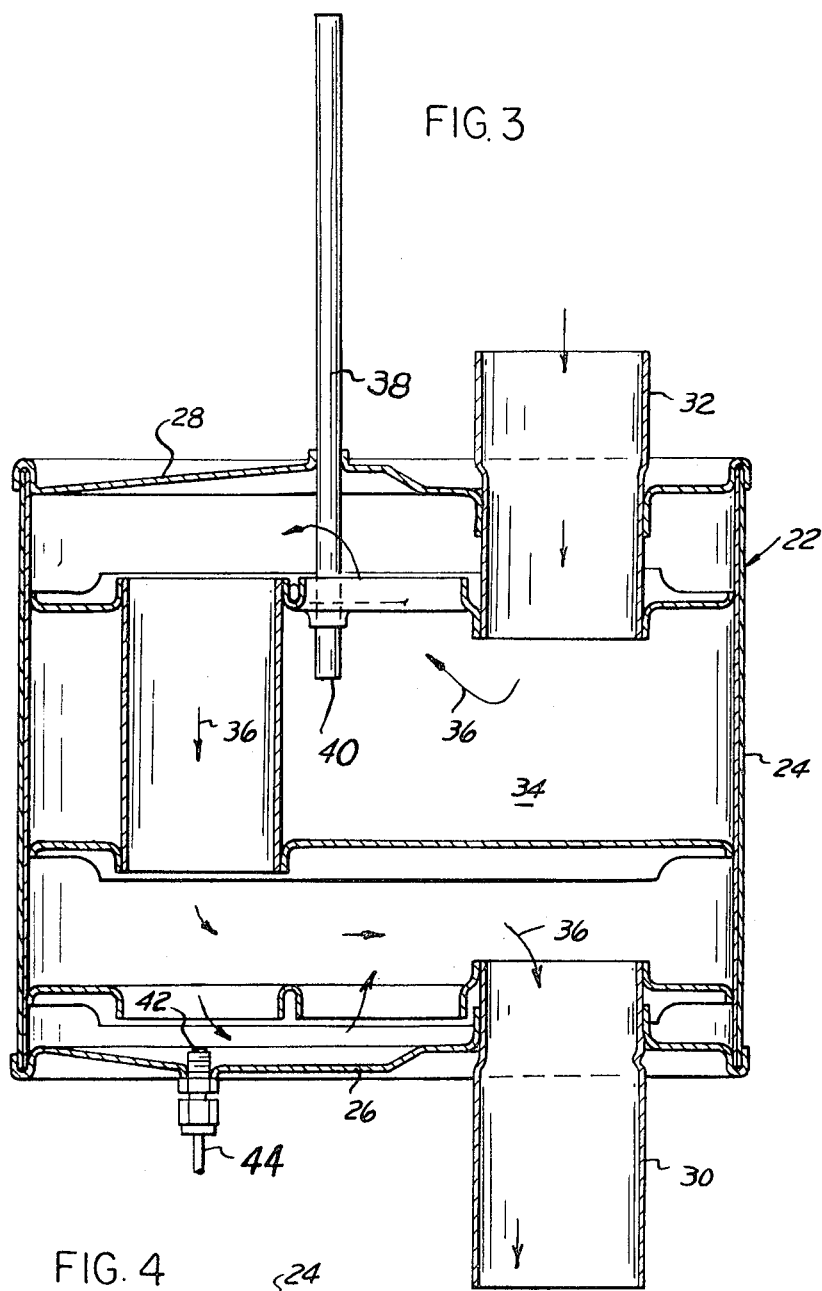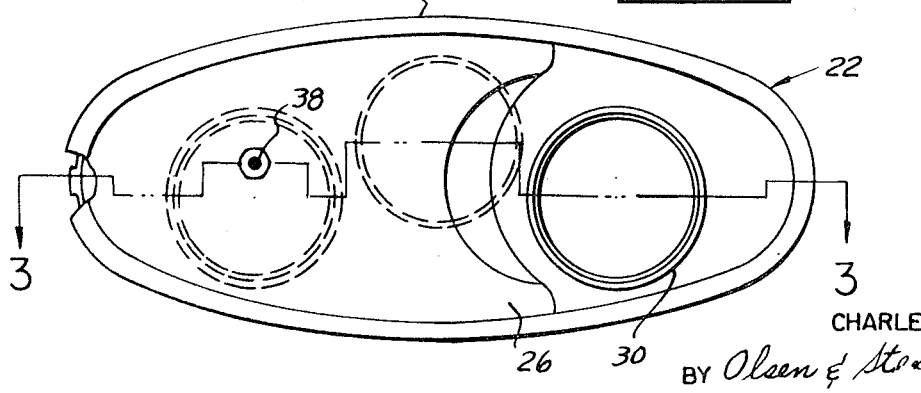

METHOD AND APPARATUS FOR DISPOSING OF HUMAN WASTE IN A VEHICLE

BACKGROUND OF THE INVENTION

This invention relates generally to the field of waste disposal and more particularly to a method and apparatus for disposing of human waste such as toilet waste and wash water waste from a vehicle of the type that is propelled by a fuel burning engine.

The invention is particularly applicable to recreational vehicles having internal combustion engines although it is to be understood that the invention has broader applications and may be used in other vehicles such as buses, boats or airplanes. The invention is also useful with any vehicle having a fuel burning engine of the type provided with an exhaust pipe, such as diesel engines and turbines.

Recreational vehicles, trailers, buses, boats and airplanes are commonly provided with toilets and lavatories for use by human occupants of the vehicle. In the usual case, the toilet has an outlet which leads to a holding tank for the waste, and in some cases the lavatory has an outlet which leads to the same holding tank. In the past, it has been necessary to periodically manually empty the holding tank, and this is not only an inconvenience but an unpleasant task. This is particularly true because discharge facilities for the holding tanks are not readily available at convenient locations. Even when such a location is found, it is necessary to connect a hose or carry the waste in buckets from the holding tank to a discharge opening of a sewer leading to a sewage treatment plant.

U.S. Pat. No. Re. 26,891 suggests employing the waste heat from the vehicle engine for vaporizing liquid waste. However, in the system disclosed in the aforementioned patent, the waste is injected into a drum which surrounds the exhaust pipe and the necessary temperatures for killing bacteria and odor producing compounds in the waste cannot be reached in a system of this type. U.S. Pat. No. 2,658,202 shows a vehicle disposal system for vehicles wherein the incineration step is accomplished in an externally heated coil having a discharge valve which can be opened only when the vehicle is moving. It can readily be appreciated that this is quite different from the present invention wherein the vaporizing and sanitizing of the waste takes place concurrently with expelling of the waste into the atmosphere since the waste is vaporized directly in the vehicle exhaust. It is an object of the present invention, therefore, to provide an improved method and apparatus for disposing of liquid and organic waste in a vehicle by discharging the waste directly into the vehicle exhaust only during movement of the vehicle.

SUMMARY OF THE INVENTION

According to the present invention, a vehicle having an engine provided with an exhaust pipe is equipped with apparatus for disposing of liquid and organic waste comprising a holding tank for the waste and a heating chamber for vaporizing and sanitizing the waste. The chamber is interposed in the vehicle exhaust system and a pump connected to the holding tank and the heating chamber discharges liquid waste containing small particles of organic matter into the hot exhaust gases in the heating chamber. The hot exhaust gases vaporize the liquid waste and heat the particles to a temperature sufficient to kill all bacteria therein so as to effectively sanitize this material. A speed sensing device on the vehicle is connected to the pump so that the necessary electrical signal for actuating the pump is provided only when the vehicle is traveling at a speed that is above a selected speed. In order for the pump to operate, it is also necessary that the pump receive a signal from a temperature sensing probe which extends into the heating chamber. As a result, the pump will operate to pump waste from the holding tank to the heating chamber only when the temperature in the heating chamber is sufficient to insure the destruction of all bacteria and odor producing agents in the waste. In addition, to positively preclude the presence of any residual odors from the waste in the vicinity of the vehicle, the connection of the speed sensing device to the pump insures that waste sanitizing will occur only when the vehicle is moving at a speed above a predetermined low speed. Structure in the heating chamber defines a tortuous path through which the hot engine exhaust gases must flow from the inlet to the outlet of the chamber, the temperature sensing probe is located near the outlet for the chamber and the waste is discharged into the chamber adjacent the inlet to thereby assure subjection of the waste to gases which are always hotter than the temperature of the gases sensed by the probe. To insure against clogging of the conduit which extends between the holding tank and the heating chamber, a filter is provided on the conduit within the holding tank at a location such that agitation of the fluid within the tank caused by motion of the vehicle will act to clean the filter. Limiting of intake into the filter to only those times when the vehicle is moving insures continuous cleaning of the filter. Thus, the method and apparatus of this invention provides for the complete disposal of liquid and organic waste from the holding tank without any possibility of residual odors around the vehicle.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 3 is a longitudinal sectional view of the waste sanitizer unit in the apparatus of this invention as seen from substantially the line 3—3 of FIG. 4;

FIG. 4 is an end view of the sanitizer unit in the apparatus of this invention;

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
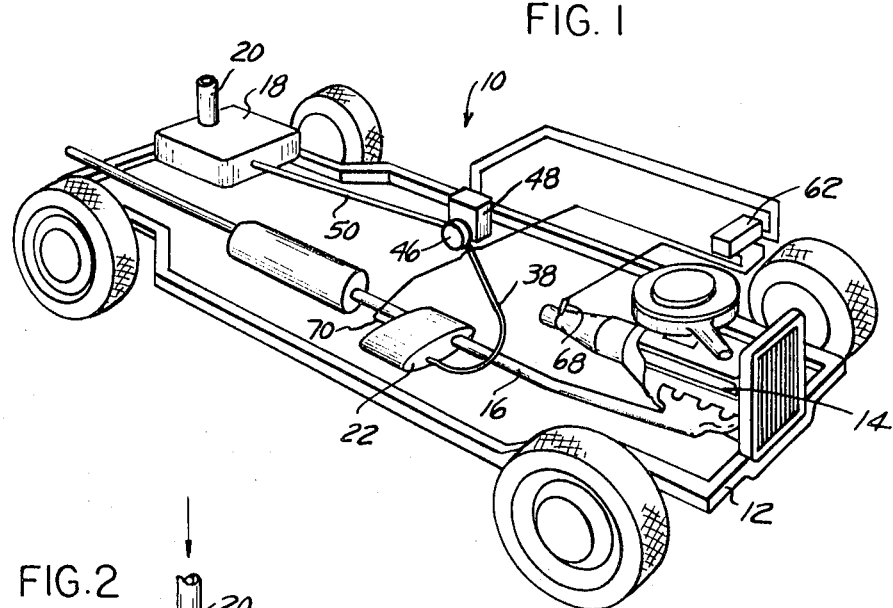
FIG. 1 is a perspective view of the apparatus of this invention shown in assembly relation with a vehicle, only portions of which are illustrated.

With reference to the drawing, the apparatus of this invention, indicated generally at 10, is illustrated in FIG. 1 in assembly relation with a vehicle 12 having an engine 14, of internal combustion type, having an exhaust pipe 16. The apparatus 10 includes a holding tank 18 which is connected by an inlet pipe 20 with a toilet, and in some cases a lavatory, on the vehicle 12, so that the holding tank 18 receives liquid and organic toilet wastes.

The apparatus 10 also includes a sanitizer unit 22 which, as shown in FIGS. 3 and 4, consists of a housing 24 having end walls 26 and 28. The unit 22 is interposed in the exhaust pipe 16 so that the unit 22 has an outlet pipe 30 mounted in the end wall 26 and an inlet pipe 32 mounted in the end wall 28. The interior of the housing 24 constitutes a heating chamber 34 which is configured so that the hot exhaust gases traveling through the housing 24 must follow a tortuous path indicated by the arrows 36 in FIG. 3. A waste supply conduit 38 terminates in a discharge end 40 which projects into the heating chamber 34 at a position close to the inlet pipe 32. A temperature sensing probe 42 in the form of a thermocouple, is mounted at 44 at a position close to the outlet pipe 30. As a result, since the exhaust gases inevitably cool to some extent during travel from the inlet pipe 32 to the outlet pipe 30, the sensing probe 42 will always sense a temperature which is cooler than the temperature in the heating chamber 34 adjacent to the discharge end 40 of the conduit 38 where the waste to be sanitized is discharged. This arrangement insures that the temperature within the chamber 34 will always be at a high enough temperature to accomplish the necessary waste sanitizing.

Figure 2:
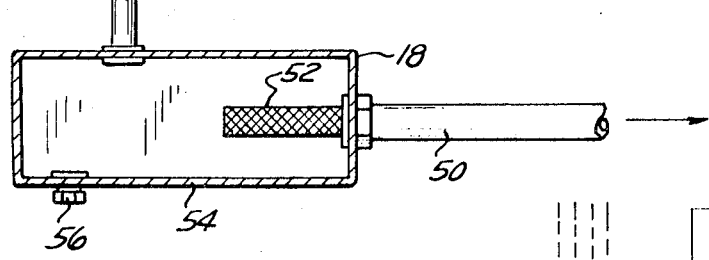
FIG. 2 is a vertical sectional view of the holding tank in the apparatus of this invention showing the inlet and outlet conduits therefor.

The inlet conduit 38 for the unit 22 is connected to a pump 46 (FIG. 1) which is driven by an electric motor 48. The pump 46 is also connected to a conduit 50 connected to the holding tank 18 and provided on its inlet end with a tubular filter 52 which is positioned within the holding tank 18 as shown at FIG. 2. The filter 52 projects horizontally into the tank 18 at a position above the bottom wall 54 of the tank 18, which is also provided with a cleanout plug 56, so that when the vehicle 12 is in motion the agitation of the fluid within the tank 18 will continuously wash across the filter 52 to prevent it from becoming clogged. Thus, when the pump 46 is operating. liquid waste containing small particles of organic waste is moved by the pump 46 through the conduits 50 and 38 for discharge into the unit 22. In the unit 22, the waste is subjected to the hot exhaust gases which create a turbulent superheated steam bath in the chamber 34 which vaporizes the liquid waste and totally destroys all of the bacteria within the waste.

Figure 5:
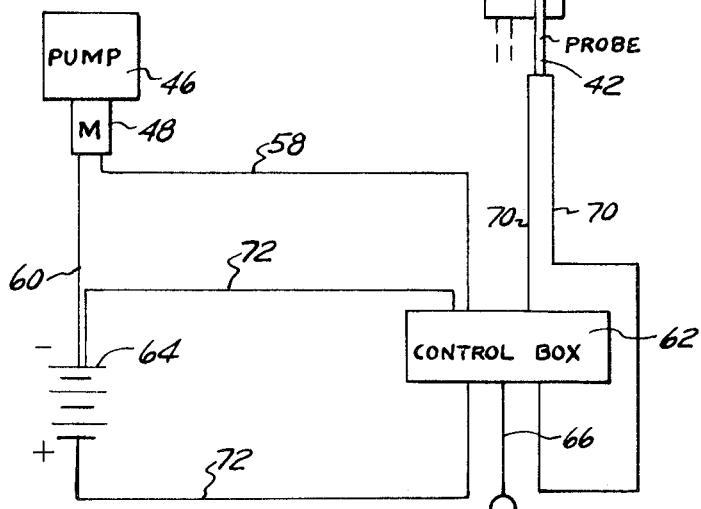
FIG. 5 is a wiring diagram showing the assembly of the pump and the control elements therefor in the apparatus of this invention.

The pump motor 48 is connected by conductors 58 and 60 to a control box 62 and the vehicle battery 64, as shown in FIG. 5. The control box 62 is also connected by a conductor 66 to a speed sensing unit 68 and by conductors 70 to the temperature sensing probe 42. Still other conductors 72 connect the battery 64 to the control box 62. The speed sensing device 68 is a conventional speed switch which is connected to the conventional speedometer cable for the vehicle 12 at the transmission. Conventional structure within the control box 62 provides for the transmission of a "turn-on" electrical signal to the motor 48 only when the speed sensing device 68 senses a speed of the vehicle 12 above a predetermined speed, for example a speed of 30 miles per hour or a speed range of 25–40 m.p.h., and when the temperature sensing probe 42 indicates a temperature in the heating chamber 34 above a predetermined temperature, for example, 750° F. Thus, only when both of these temperature and speed conditions exist will the motor 48 drive the pump 46. As a result, destruction of bacteria and objectionable odors in the waste in the heating chamber 34 is assured. Since the pump 46 can operate only when the vehicle 12 is traveling above a predetermined speed for which the speed switch 68 is set, any possibility of residual odors from the burning of the waste in the burner 22 remaining in the vicinity of the vehicle 12 is eliminated. In addition, since the pump 46 can operate only when the vehicle is in motion, possibility of clogging of the filter 52 by solid matter in the waste within the holding tank 18 is likewise eliminated because fluid is being drawn through the filter 52 only when the vehicle is in motion and the vehicle motion produces agitation of the fluid in the holding tank 18 which in turn washes and cleanses the filter 52 so as to maintain it in an unclogged condition.

Figure 6:
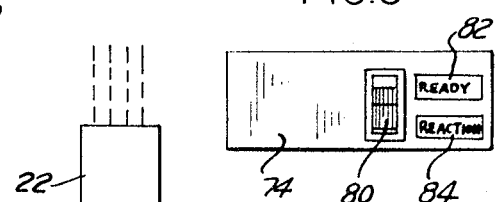
FIG. 6 is a view of the operating control panel for the apparatus of this invention.

The vehicle 12 is equipped with an operating panel 74 (FIG. 6) positioned in a convenient location for the vehicle operator and consisting of an on-off switch 80, a ready light 82 and a reaction light 84. To start the apparatus 10, the operator first turns the switch 80 to the "on" position which provides for energizing of the ready light 82. When the speed of the vehicle reaches a speed above the speed or speed range for which the switch 68 is set, the sensing speed unit 68 will provide an actuating electrical signal to the pump motor 48 and at this speed, assuming the engine 14 is under load, the temperature in the heating chamber 34 will also be above the preset temperature so that the probe 42 will likewise provide the necessary electrical signal for the operation of the motor 48. The pump 46 will then operate to deliver liquid and organic waste to the sanitizer unit 22 from the holding tank 18 and will operate continuously in this manner until either the vehicle speed falls below the preset speed for the temperature in the chamber 34 falls below the preset temperature. The latter condition would likely happen only when the vehicle 12 is traveling downhill so that there is no load on the engine 14. During operation of the pump 46, the reaction light 84 on the panel 74 will glow to indicate to the vehicle operator that the apparatus 10 is operating to dispose of waste. When the vehicle slows down to a speed below the speed for which the sensing unit 68 is set, the pump 46 will stop and the light 84 will go out.

It can thus be seen that the apparatus 10 of this invention operates continuously while the vehicle 12 is in motion to destroy waste from the holding tank 18 and when the vehicle 12 is traveling at a slow rate of speed or is at rest, the waste is maintained in the holding tank 18 for future disposal. As a result, disposal of the waste is accomplished at a time when there is no danger that any residual odors will have an adverse effect on the occupants of the vehicle 12. Furthermore, when the apparatus 10 is operating to dispose of waste, a complete destruction of all bacteria and all but residual odors is insured.

It is claimed:

1. In a vehicle having an engine provided with an exhaust system, apparatus for disposing of liquid and organic waste comprising a holding tank for said waste, means forming a heating chamber in said exhaust system for vaporizing and sanitizing said waste, vehicle speed sensing means, and pump means operatively associated with said speed sensing means and connected to said holding tank and said heating chamber for conveying waste from said tank to said chamber only when said sensing means senses a speed of said vehicle above a predetermined speed.

2. Apparatus according to claim 1 further including means capable of sensing the temperature in said chamber and operatively associated with said pump means providing for operation of said pump means only when the temperature in said chamber is above a predetermined temperature.

3. Apparatus according to claim 2 wherein said temperature sensing means comprises probe means extending into said chamber.

4. Apparatus according to claim 1 wherein said pump means is an electrically driven pump and said speed sensing means operates to provide an electrical operating signal to said pump.

5. Apparatus according to claim 1 wherein said heating chamber comprises a housing having a pair of ends, an inlet for said housing in one of said ends and an outlet for said housing in the other one of said ends, and means in said housing defining a tortuous path through which hot gases must flow from said inlet to said outlet.

6. Apparatus according to claim 5, wherein said pump means is connected to said chamber by a conduit means which terminates in said chamber at a position in said path closer to said inlet than to said outlet.

7. Apparatus according to claim 6 wherein said pump means is connected to said tank by pipe means that is in fluid communication with said tank, and filter means for said pipe means disposed in said tank at a position above the lower wall thereof so that agitation of liquid in said tank caused by motion of said vehicle will act to clean said filter means.

8. Apparatus according to claim 5 further including temperature sensing means connected to said pump means providing for operation thereof only when the temperature in said chamber is above a predetermined temperature, said temperature sensing means extending into said chamber at a position in said path closer to said outlet thereof than the inlet.

9. In a vehicle, apparatus for disposing of liquid and organic waste comprising a waste holding tank having a bottom wall, sanitizer means for vaporizing and sanitizing said waste, vehicle speed sensing means, pump means operatively associated with said speed sensing means for conveying waste from said tank to said sanitizer means only when said sensing means senses movement of said vehicle, and conduit means connecting said pump to said holding tank, said conduit means terminating in a filter member disposed in said tank at a position spaced above said bottom wall so that agitation of liquid in said tank will wash said filter member.

10. Apparatus according to claim 9 wherein said filter member is tubular and is in a generally horizontal position in said tank.

11. A method of disposing of liquid and organic waste in a vehicle having an engine, said method comprising the steps of:
   a. collecting said waste at one location on said vehicle;
   b. utilizing the heat from said engine to sanitize and vaporize said waste at another location on said vehicle; and
   c. continuously moving said waste from said one to said another location only when said vehicle is moving at a speed above a predetermined speed and when the temperature at said other location is above a predetermined temperature, and retaining said waste in said one location when said vehicle is stationary or moving at a speed below said predetermined speed.

12. In a vehicle having an engine provided with an exhaust system into which waste heated gases from the engine are discharged, apparatus for disposing of liquid and organic waste comprising a holding tank for receiving said liquid and organic waste, conduit means in communication with said holding tank and said exhaust system, vehicle speed sensing means, temperature sensing means for measuring a temperature condition associated with the operation of said engine, and pump means operatively associated with said speed sensing means and said temperature sensing means and located in said conduit means for conveying waste from said holding tank to heated gases in said exhaust system only when said speed and temperature sensing means sense speed and temperature conditions above predetermined minimum values.

* * * * *